United States Patent [19]
Candiracci

[11] Patent Number: 4,917,284
[45] Date of Patent: Apr. 17, 1990

[54] APPARATUS FOR MANUFACTURING BUILDING PANELS

[75] Inventor: Angelo Candiracci, Fano, Italy
[73] Assignee: Monolite S.R.L., Fano, Italy
[21] Appl. No.: 241,725
[22] Filed: Sep. 8, 1988
[30] Foreign Application Priority Data Sep. 22, 1987 [IT] Italy .................................. 3613 A/87

[51] Int. Cl.⁴ ............................................ B23K 11/32
[52] U.S. Cl. ....................................... 228/5.1; 228/13; 228/47; 228/189; 219/56; 219/78.15; 219/79; 181/284; 181/290; 52/145
[58] Field of Search ...................... 228/51, 13, 47, 189; 219/56, 78.15, 79; 52/145; 181/284, 288, 290

[56] References Cited
U.S. PATENT DOCUMENTS 4,500,763  2/1985  Schmidt et al. ......................... 219/56
4,667,707  5/1987  De Schutter ........................... 219/56

*Primary Examiner*—Nicholas P. Godici
*Assistant Examiner*—Samuel M. Heinrich
*Attorney, Agent, or Firm*—Guido Modiano; Albert Josif

[57] ABSTRACT

The apparatus, for manufacturing building panels for construction walls with antiseismic and thermoacoustic insulation characteristics, includes a horizontal table for assembling a panel formed by at least one layer of insulating material and by a pair of metal grids associated with the opposite faces of said insulating layer, means for advancing said panel step by step to a station for inserting, cutting and welding connecting elements of said metal grids. The inserting and welding station includes means adapted to insert the connecting elements transversely to the insulating layer, lower welding means adapted to weld the connecting elements, which pass through the insulating layer, to the lower metal grid of the panel, means for cutting the connecting elements at the upper metal grid of the panel, and upper welding means adapted to weld the cut connecting elements to the upper metal grid of the panel.

10 Claims, 4 Drawing Sheets

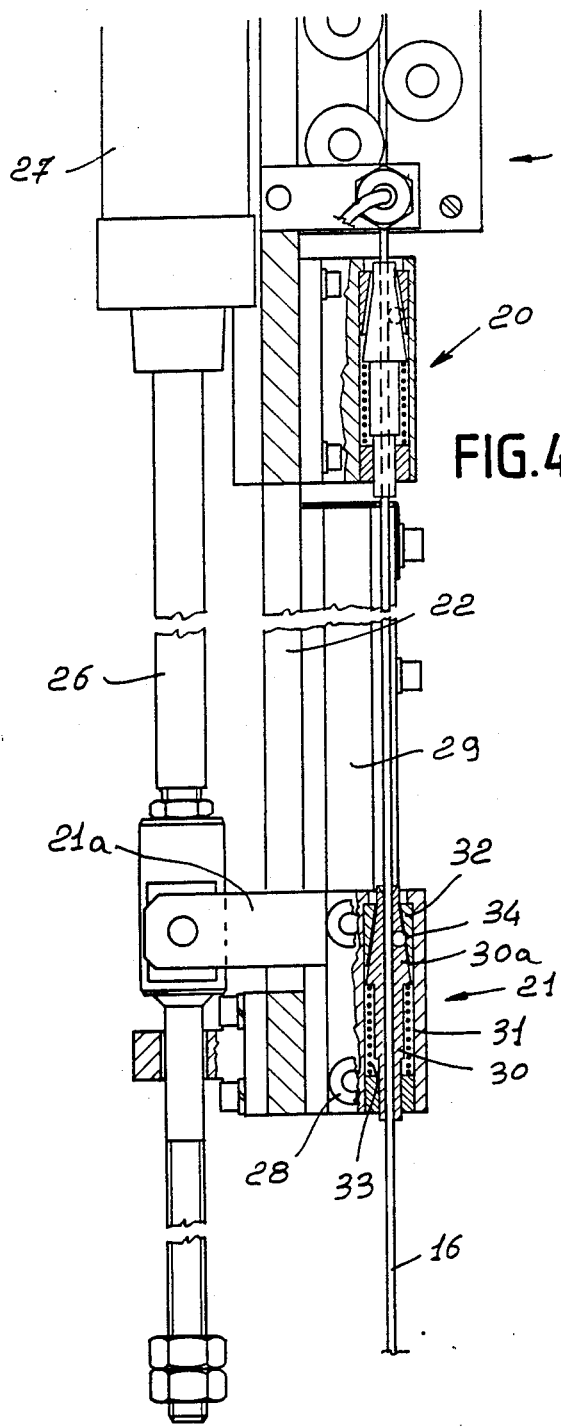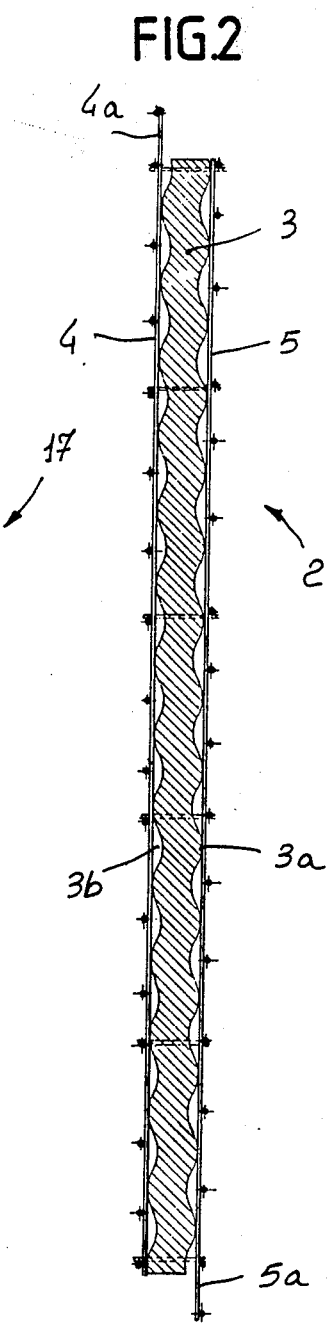

APPARATUS FOR MANUFACTURING BUILDING PANELS

BACKGROUND OF THE INVENTION

The present invention relates to an apparatus for manufacturing building panels, particularly for constructing antiseismic and thermoacoustically insulated walls.

As is known, currently in the field of building there is the need to construct dividing and load-bearing walls capable of ensuring high thermal and acoustic insulation and high characteristics.

For this purpose, panels constituted by a layer of foamed plastic material and by a pair of metal grids associated with the opposite faces of said layer are conveniently used; the metal grids are fixed, upon installation, into the plaster which covers the wall. These panels are also usable to produce forms into which concrete is cast in a conventional manner to construct antiseismic load-bearing walls. U.S. Pat. No. 4,500,763 (Schmidt et al), for example, discloses a grid body consisting of two parallel plane grids and having an insulating core.

SUMMARY OF THE INVENTION

The aim of the present invention is to provide an apparatus which allows to easily and rapidly manufacture panels for the construction of walls having antiseismic and thermoacoustic insulation characteristics.

Within this aim, a further object of the present invention is to provide an apparatus which is simple in concept, reliable in operation, versatile in use for different types of panel to be manufactured, and having a relatively economical cost.

This aim and this object are achieved, according to the invention, by an apparatus for manufacturing building panels, as described in the claims.

BRIEF DESCRIPTION OF THE DRAWINGS

Further characteristics and advantages of the invention will become apparent from the detailed description of a preferred embodiment of the apparatus according to the invention, illustrated only by way of non-limitative example in the accompanying drawings, wherein:

FIG. 2 is a lateral view of a panel manufactured with said apparatus;

FIG. 4 is a detail view of said means for inserting the connecting elements;

DESCRIPTION OF THE PREFERRED EMBODIMENTS

Figure 1:
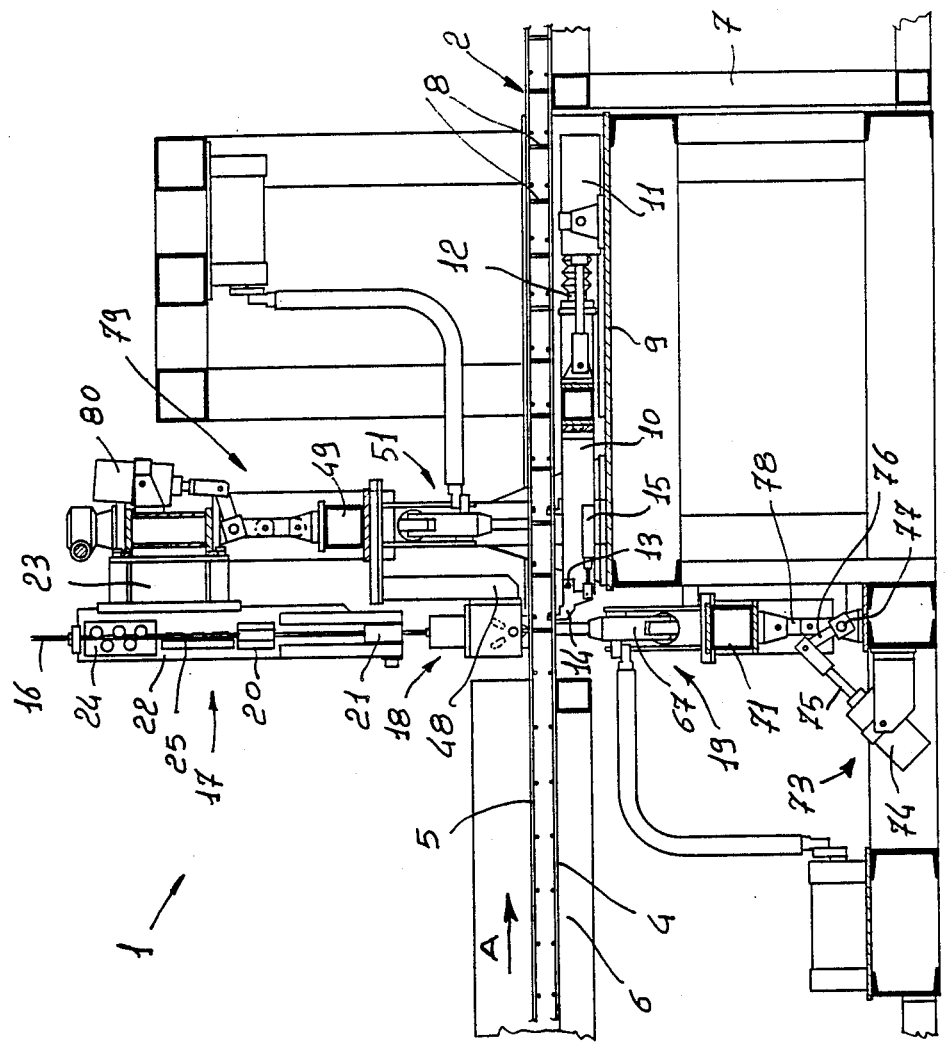
FIG. 1 is a longitudinal vertical sectional view of the apparatus according to the invention.
Figure 3:
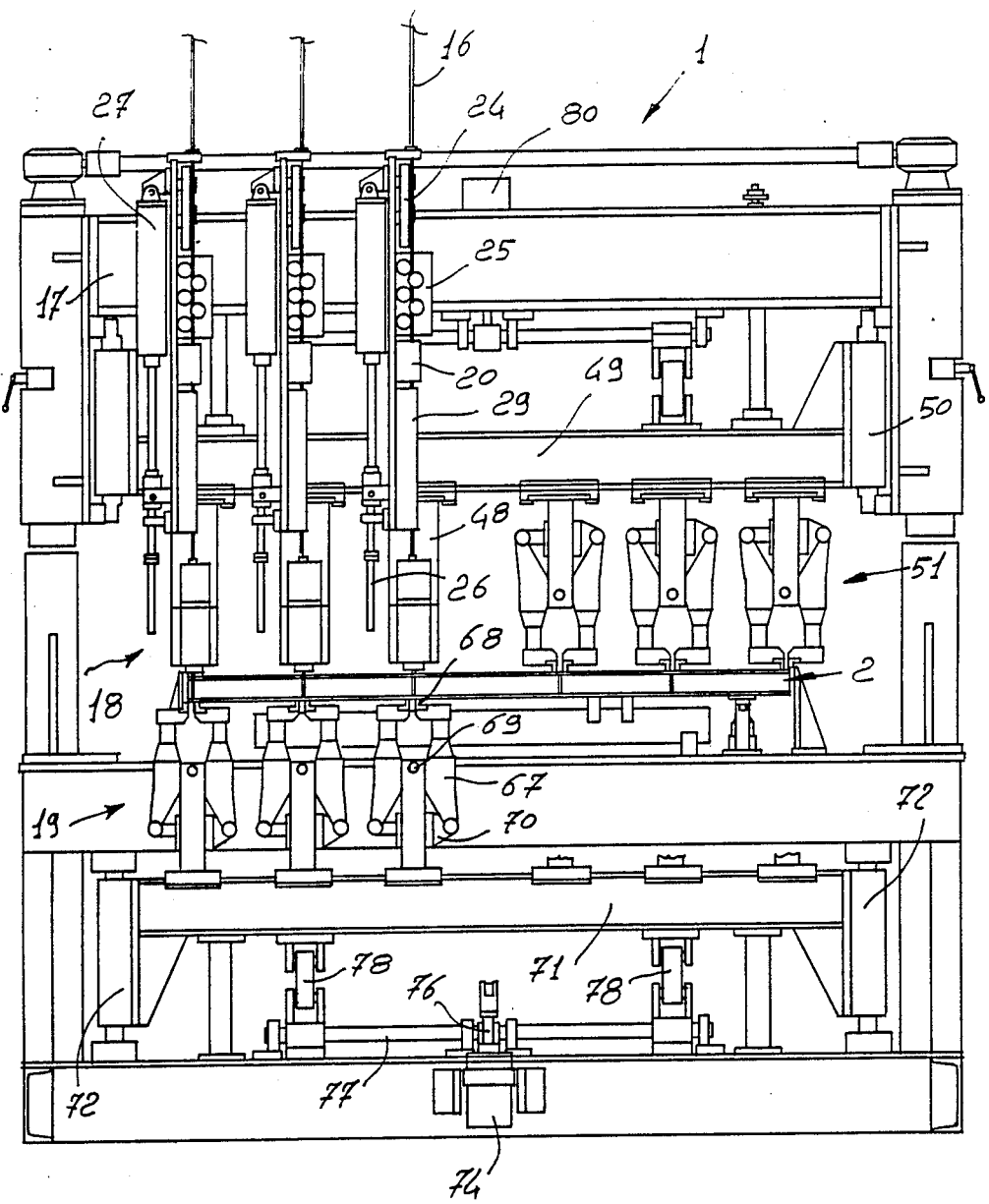
FIG. 3 is a partially cutout transverse vertical sectional view of the apparatus.

With reference to the figures, the reference numeral 1 generally indicates the apparatus, according to the invention, for manufacturing panels 2 for the construction of antiseismic and thermoacoustically insulated walls. In the panels 2, in particular, at least one layer 3 of insulating material (such as foamed polystyrene, cork, polystyrene and the like) is interposed between a pair of electrically welded square-mesh metal grids 4 and 5.

As shown in FIG. 2, the insulating layer 3 is undulated, so as to define an alternated succession of peaks 3a and troughs 3b which are vertical when the layer 3 is installed. The metal grids 4 and 5 are associated with the layer 3, in tangential contact with the peaks 3a of the opposite faces thereof, on a horizontal assembly table 6, defined by the fixed frame 7 of the apparatus 1. In particular, the troughs 3b of each face are arranged in middle position with respect to the correspondingly parallel rods of the metal grid associated with said face.

Conveniently, the grids 4 and 5 have respective wings 4a and 5a along the opposite vertical sides and protruding from the layer 3. Said wings are adapted to superimpose, upon installation, on the adjacent panels, so as to practically have no discontinuity in the structure thus produced. To facilitate the execution of the wings 4a and 5a, during assembly, the table 6 is longitudinally provided with adapted lateral abutments, not shown in the drawing.

The metal grids 4 and 5 are connected to each other by means of iron elements 8 which are driven transversely through the insulating layer 3. For this purpose the sandwich constituted by the grids 4, 5 and by the interposed layer 3 is advanced step by step in the direction indicated by the arrow A, at a station for inserting, cutting and welding the connecting elements 8.

The panel is advanced step by step by a reciprocating device arranged after said station and mounted below said panel on a table 9 defined by the fixed frame 7. This device comprises a frame 10 which is actuated with reciprocating motion in the direction A by a jack 11. The frame 10, slideable on lateral guides 12, has a hook 14 which is pivoted at pivot 13 and is actuated by a further jack 15 in turn supported by said frame.

The hook 14 is adapted to engage the downwardly arranged grid 4 so as to advance the panel upon actuation by the jack 11; vice versa, during the return stroke of the frame 10, the further jack 15 disengages the hook 14 from the grid 4.

In the inserting, cutting and welding station, a plurality of iron rods 16, arranged vertically side by side, are fed on a vertical plane transverse to the direction of advancement of the panel, and from them said connecting elements 8 are obtained.

Coaxially to each of said iron rods 16, an insertion device 17 and a cutting device 18 are provided above the panel; below the panel there is a welding element 19.

Each device 17 for the insertion of the rod 16 in the insulating layer 3 has, as illustrated in detail in FIG. 4, a pair of respectively upper and lower rod grip elements indicated at 20 and 21. The upper grip element 20 is fixed to a related upright 22 projecting from a beam 23 of the frame 7; the upright 22 upwardly has a pair of roller elements 24, 25 arranged on orthogonal planes for aligning the rod 16. The lower grip element 21 is instead rigidly coupled to the stem 26 of a related vertical-axis jack 27 by means of a coupling 21a and is slideably guided, by means of rollers 28, between a pair of opposite grooved guides 29 rigidly associated with said upright 22.

The grip elements 20 and 21 are similarly constituted by a sleeve 30 which defines an upwardly converging conical portion 30a at its top. The sleeve 30 is movable in a seat 31, upwardly provided with a bush 32 having a corresponding internal conicity, and is pushed upwards by a helical spring 33. At the portion 30a, the sleeve 30 has a transverse accommodation hole for a small ball 34 which is adapted to act on the surface of the rod 16, which is driven inside said sleeve.

Figure 5:
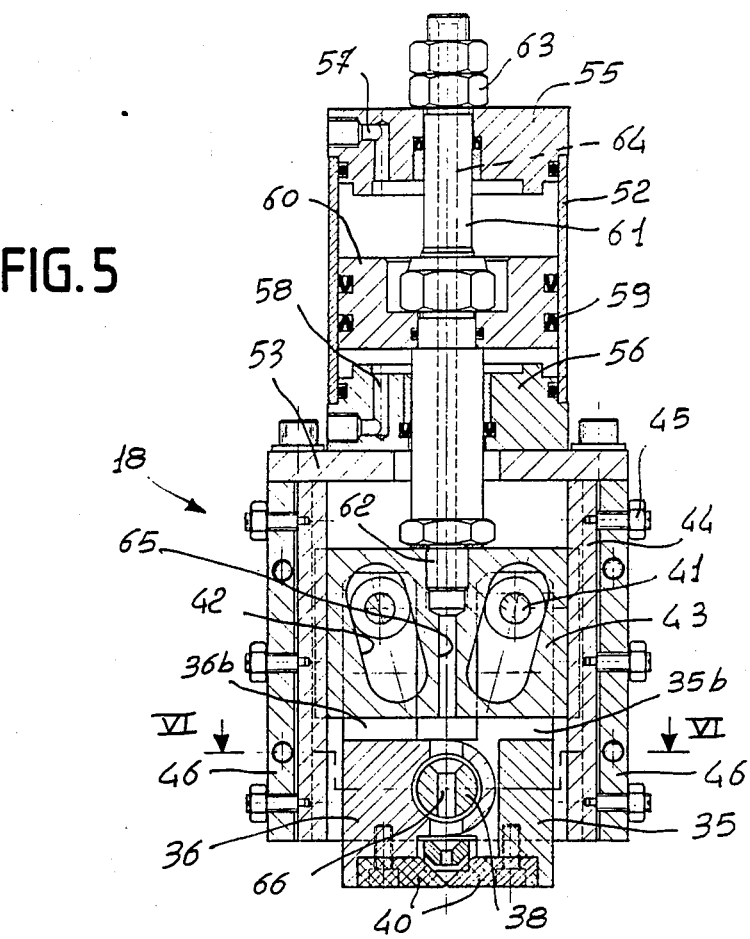
FIG. 5 is a vertical sectional view of said cutting means.
Figure 6:
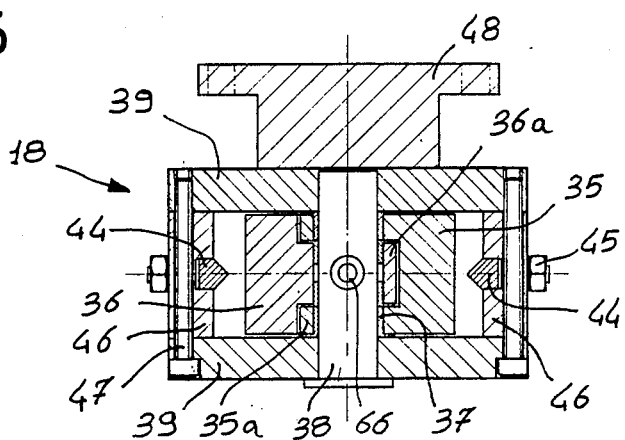
FIG. 6 is a sectional view taken along the line VI-VI of FIG. 5.

As shown in detail in FIGS. 5 and 6, the cutting device 18 comprises a pair of jaws 35, 36 which are pivoted, by means of the interposition of related bearings 37, on a pivot 38 mounted horizontally between a pair of walls 39. For this purpose, at the articulation region, the jaw 35 has a fork-like portion 35a adapted to allow the insertion of a narrowed portion 36a of the jaw 36. The jaws 35 and 36 have downwardly fixed respective cutters 40 adapted to cooperate with one another, while they upwardly extend with related arms 35b, 36b having transverse pivots 41. These pivots engage respective downwardly converging slots 42 provided in a slider 43 which is vertically slideable between the walls 39.

The slider 43 is guided on opposite guides 44 which are fixed by means of screws 45 on opposite walls 46, in turn vertically locked by screws 47 between the walls 39, so as to constitute the box-like casing of the cutting device. Said box-like casing is supported by an arm 48 which is rigidly coupled to a horizontal beam 49 arranged transversely to the axis advancement of the panels and slideably supported, at its ends, on a pair of vertical guides 50. As described in further detail hereinafter, the beam 49 is downwardly provided with further welding elements 51 arranged above the panel 2 and downstream the welding elements 19.

The cutting device 18 is actuated by a cylinder 52 mounted with a vertical axis above a plate 53 which upwardly closes the casing of said device. The cylinder 54 is locked between a pair of respectively upper and lower heads 55 and 56 in which the ducts 57, 58 are provided for supplying and discharging the active fluid. A piston 60 is sealingly slideable in the cylinder 52 by means of appropriate gaskets 59 and has a stem 61 which is equally sealingly guided on the heads 55, 56 and is downwardly fixed, by means of a threaded tang 62, to the slider 43; stroke limit nuts 63 are screwed on top of the stem 61.

Thus by lifting the slider 43 the piston 60 causes the angular opening rotation of the jaws 35, 36 as an effect of the mutual approach of the pivots 41 which engage the slots 42; vice versa the descent of the slider actuates the closure of the jaws.

For the passage of the iron rod 16 to be cut, the stem 61 has an axial hole 64 which extends with a coaxial hole 65 of the slider 43 and with a transverse hole 66 of the pivot 38.

The lower and upper welding elements, respectively 19 and 51, are of a substantially known type and comprise pairs of pincers 67 bearing the welding elements 68 at one end and rotatable about a central fulcrum 69 upon the actuation of a related jack 70. The lower welders 19 are vertically supported above a beam 71 which is transversely horizontal to the apparatus; the beam 71 is slideable at its ends along vertical guides 72.

The lower welders 19 are vertically movable, in step with the advancing of the panel 2, upon the actuation of a reciprocating-motion element 73 actuated by a cylinder 74. The stem 75 of the cylinder 74 is articulated to a crank 76 which is centrally coupled to a horizontal shaft 77 rotatably supported at the ends of the fixed frame 7; a pair of small connecting rods 78, pivoted below the beam 71, are in turn articulated to the shaft 77.

A cylinder 80 controls a further reciprocating-motion element 79, fully similar to the motion element 73 and vertically moving cutting elements 18 and the upper welders 51 supported by the beam 49.

Thus, at each step of the panel 2, moved by the frame 10, the reciprocating-motion elements 73 and 79 lift the beam 71 and lower the beam 49 simultaneously, so as to lock said panel between the lower welders 19 and the coaxial cutting elements 18. At this point the welders 19 weld the rods 16, previously inserted through the insulating layer 3, to the lower metal grid 4, while the cutters 40 cut the elements 18 substantially at the level of the upper metal grid 5, so as to define the connecting elements 8.

At the successive step of the panel 2, the upper welders 51, which lower together with the cutting devices 18 as they are equally actuated by the reciprocating-motion elements 79, weld the previously cut connecting elements 8 to the upper metal grid 5. Naturally the advancement step of the panel 2 is equal to the distance occurring, in the direction of advancement, between the cutting devices 18 and the upper welders 51 arranged downstream.

The iron rods 16 intended to become the connecting elements 8 are inserted in the insulating layer 3 by the device 17 in step with the advancement of the panel 2. In particular the rods 16 are alternately locked by the lower movable grip element 21, during the active downward stroke actuated by the jack 27, and by the fixed upper grip element 20, during the return stroke of said lower grip element 21. This locking is determined by the respective ball 34 of the grip elements 20, 21 which is pushed to lock the rod passing within the sleeve 30 by the conical coupling of the portion 30a within the bush 32. In the case of the upper grip element 20, said coupling is instead released by the traction exerted on the sleeve by the rod 16, which is pulled downwards in the active stroke of the lower grip element 21, and in the case of the lower grip element 21, by the traction exerted on the bush by the element itself, which is pulled upwards in the return stroke.

To conclude, the described apparatus allows to easily manufacture panels with high antiseismic and thermoacoustic insulation characteristics, easy to install and adaptable to the various requirements of construction. In particular it is possible to couple a pair of said panels with appropriate spacers to produce a form adapted for the containment of a concrete casting. It should be noted that the undulations of the insulating layer 3 allow a more solid grip of the metal grids 4, 5, increasing thereby the resistance of the constructed walls.

In the practical embodiment of the invention, the materials employed, as well as the shape and dimensions, may be any according to the requirements.

I claim:

1. Apparatus for manufacturing building panels, comprising a horizontal table for assembling a panel formed by at least one layer of insulating material and by a pair of metal grids associated with the opposite faces of said insulating layer, means for advancing said panel step by step to a station for inserting, cutting and welding elements for connecting said metal grids, said inserting, cutting and welding station comprising means adapted to insert said connecting elements transversely to said insulating layer, lower welding means adapted to weld said connecting elements, which pass through said insulating layer, to the lower metal grid of the panel, means for cutting said connecting elements at the upper metal grid of the panel, and upper welding means adpted to weld said cut connecting elements to the upper metal grid of the panel, said advancement of the panel being actuated by a reciprocating device located below said panel and comprising a frame which is actuated by a jack and has a hook pivoted thereto which is actuated by a further jack to engage the lower grid during the active stroke and to disengage therefrom during the return stroke of said frame.

2. Apparatus according to claim 1, wherein said lower welding means and said cutting means are arranged vertically coaxial and are actuated with reciprocating motion, so as to lock between themselves said panel upon respectively welding said connecting elements to the lower metal grid and cutting said connecting elements at the upper metal grid.

3. Apparatus according to claim 1, wherein said upper welding means are arranged after said cutting means, along the direction of advancement of the panel, their respective distance being equal to the advancing step of said panel.

4. Apparatus according to claim 1, wherein in said inserting, cutting and welding station a plurality of iron rods arranged vertically side by side are fed on a vertical plane which is transverse to the direction of advancement of the panel, said connecting elements being formed from said iron rods, coaxially to each of said iron rods there being provided an inserting device and a cutting device above the panel, and, below the panel there being provided a welding element.

5. Apparatus according to claim 1, wherein said cutting means are jointly movable with said upper welding means, in a vertical direction.

6. Apparatus according to claim 1, wherein said lower welding means and said upper welding means are vertically movable, in step with the advancement of the panel, upon the actuation of a respective reciprocating-motion element actuated by a related cylinder which is articulated by means of a crank system to a respective supporting beam for said welding means, said beam being arranged horizontally and transversely to the direction of advancement of the panel.

7. Apparatus according to claim 1, wherein said inserting means have a fixed upper grip means and a vertically movable lower grip means which are adapted to alternatively lock an iron rod, respectively during the active downward stroke and during the return stroke of said lower grip element.

8. Apparatus according to claim 7, wherein said grip elements comprise a sleeve movable in a vertical seat and defining, at its top, an upwardly converging conical portion which is adapted to couple to a bush having a corresponding internal conicity and mounted upwardly to said seat, said sleeve having, at said conical portion, a transverse accommodation hole for a ball which is adapted to act on said iron rod which is driven within said sleeve.

9. Apparatus, according to claim 1, wherein said assembly table is longitudinally provided with lateral abutments adapted to form wings on said grids, said wings being formed offset on opposite sides of said grids, each of said grids being adapted to superimpose on the side of adjacent panel upon installation.

10. Apparatus for manufacturing building panels, comprising a horizontal table for assembling a panel formed by at least one layer of insulating material and by a pair of metal grids associated with the opposite faces of said insulating layer, means for advancing said panel step by step to a station for inserting, cutting and welding elements for connecting said metal grids, said inserting, cutting and welding station comprising means adapted to insert said connecting elements transversely to said insulating layer, lower welding means adapted to weld said connecting elements, which pass through said insulating layer, to the lower metal grid of the panel, means for cutting said connecting elements at the upper metal grid of the panel, and upper welding means adapted to weld said cut connecting elements to the upper metal grid of the panel, said cutting means having pairs of jaws which have downwardly fixed respective cutters and extend upwardly with related arms having transverse pivots which engage downwardly converging slots provided in a slider which is vertically slideable in a box-like casing upon the actuation of a cylinder mounted with a vertical axis above said casing.

* * * * *